Jan. 23, 1934.   O. NYGAARD   1,944,569
WATER COOLED FURNACE WALL
Filed Dec. 22, 1928   2 Sheets-Sheet 1

INVENTOR
Oscar Nygaard,
BY
his ATTORNEY

Jan. 23, 1934.　　　O. NYGAARD　　　1,944,569
WATER COOLED FURNACE WALL
Filed Dec. 22, 1928　　　2 Sheets-Sheet 2
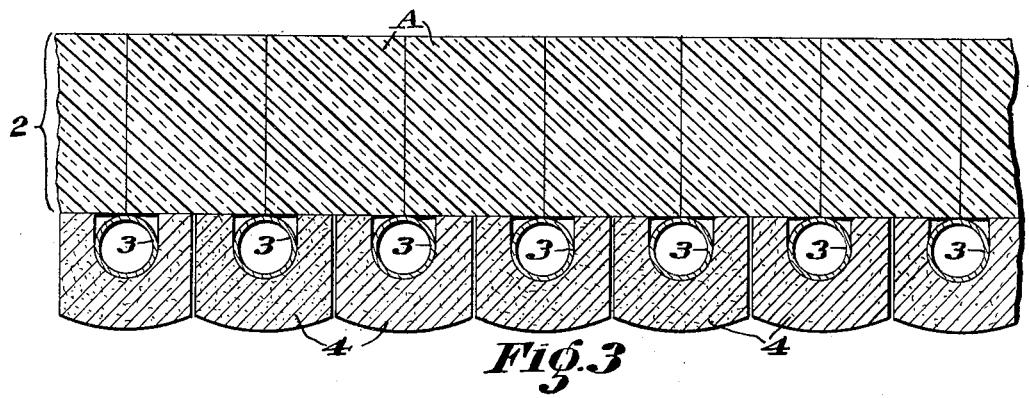
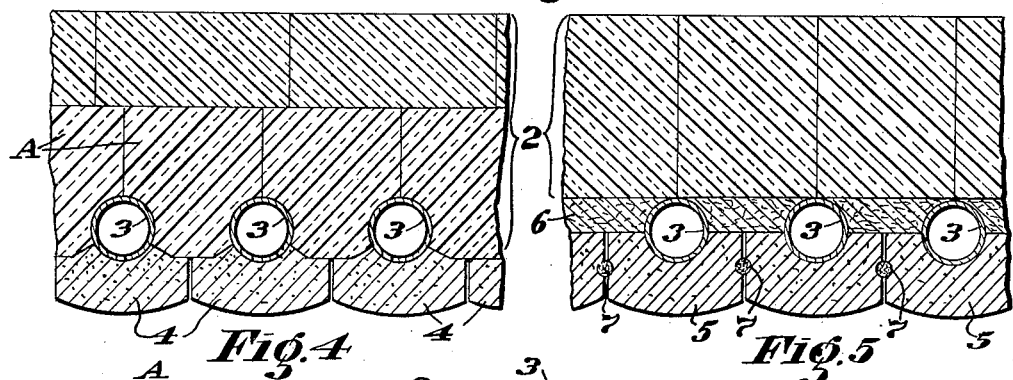
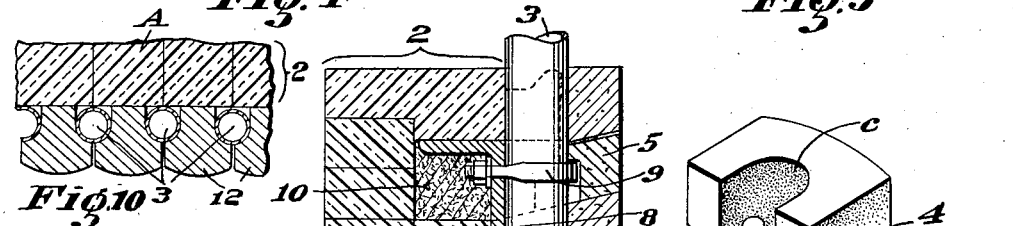
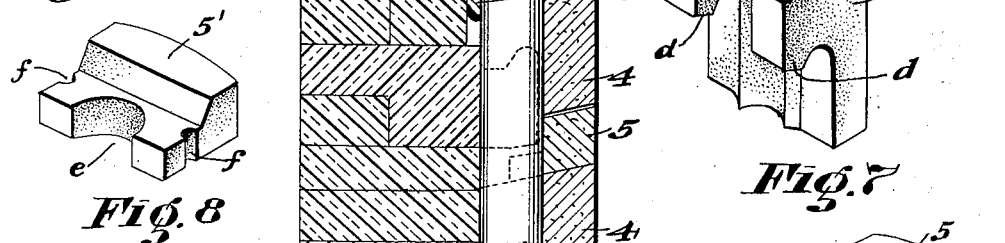
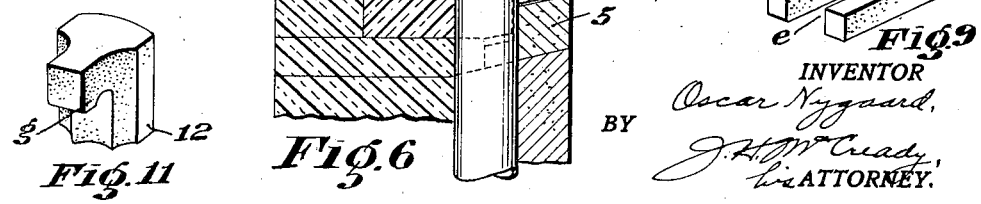
INVENTOR
Oscar Nygaard,
BY J. H. McCready,
his ATTORNEY.

Patented Jan. 23, 1934

1,944,569

UNITED STATES PATENT OFFICE 1,944,569

WATER COOLED FURNACE WALL

Oscar Nygaard, Saugus, Mass.

Application December 22, 1928
Serial No. 327,949

30 Claims. (Cl. 122—6)

This invention relates to furnace walls and more especially to furnace walls of the type in which tubes are embedded, the tubes conducting water, steam or some other fluid medium which serves to carry heat away from the wall. Walls of this general type are commonly referred to as "water cooled walls" notwithstanding the fact that the circulating medium used in the tubes may be steam or some fluid other than water.

In the furnaces of power generating plants and other installations where the furnaces are operated substantially continuously, and the furnace walls are therfore subjected to high temperatures for long sustained periods of time, much trouble has been experienced with the softening of the lining by the intense heat, and the consequent fusing of the slag and ash to the softened surfaces. It is for the purpose of reducing the temperature of the lining to such a point that adhesion of the slag and ash will not occur, that water or steam is circulated through the walls in those constructions of the type above mentioned. Even in installations of this character, however, a slow disintegration of the furnace lining occurs so that it becomes necessary after a time to renew the lining. It occasionally happens, also, that bricks in the lining will become broken and drop into the combustion chamber, or that repairs to some relatively small portion of the lining will be required from some other cause.

The present invention deals with the problems presented by these conditions, and it aims to devise a furnace wall of the water cooled type in which the renewal or repair of the lining will be greatly facilitated.

Because of the high temperatures to which these furnace linings are subjected, it is necessary to make the lining from highly refractory material such as silicon carbide. These high refractories are relatively expensive and it is, therefore, a further object of the invention to devise a construction in which such materials will be used economically while still providng a thoroughly satisfactory wall structure.

The nature of the invention will be readily understood from the following description when read in connection with the accompanying drawings, and the novel features will be particularly pointed out in the appended claims.

Figures 1, 2:
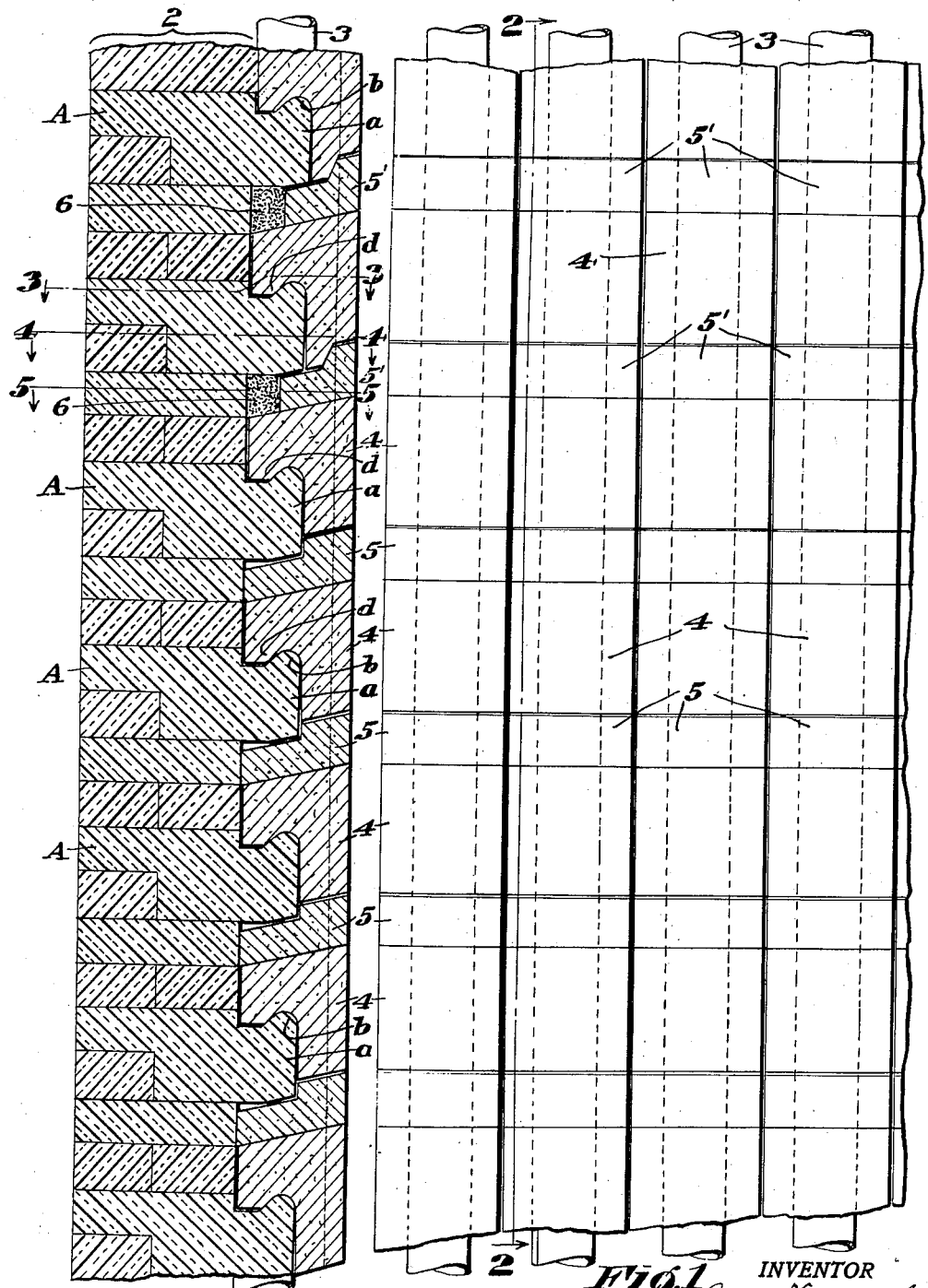
Figure 1 is a front elevation of a portion of a water cooled wall constructed in accordance with this invention.
Fig. 2 is a vertical sectional view on substantially the line 2—2, Fig. 1.

Figs. 3, 4 and 5 are horizontal sectional views on the lines 3—3, 4—4 and 5—5, respectively, Fig. 2;

Fig. 6 is a view similar to Fig. 2 showing a modified construction;

Figs. 7, 8 and 9 are perspective views of bricks used in the face portion of the wall shown in Figs. 1 to 5, inclusive;

Fig. 10 is a view similar to Fig. 3 of another embodiment of the invention; and

Fig. 11 is a perspective view of one of the bricks used in the construction shown in Fig. 10.

Referring first to Figs. 1 to 5, inclusive, the wall construction there shown comprises a rear relatively permanent wall section 2 which usually is made of fire bricks but which can be of any suitable construction. At the forward side of this wall, and partly embedded in it, is a series of substantially upright tubes 3, these tubes being adapted to conduct steam, water, or any other fluid medium which is to be used to carry heat away from the wall. At the front or fire side of the wall is a renewable facing which protects both the tubes 3 and also the rear wall section 2. It will be seen from an inspection of Figs. 1 and 2 that this facing is composed chiefly of bricks 4, although locking bricks or key bricks 5, which cooperate with the facing bricks 4, make up a part of the facing.

In order to support the facing bricks 4 in the wall but to permit them to be readily removed, bricks A of special construction are used in the permanent wall section 2. Each of these bricks A has a projection $a$ at its forward end which extends between adjacent tubes 3 and is provided at its upper edge with an upwardly extending marginal lip $b$, Fig. 2. Each of the face bricks 4 is made considerably thicker at its upper part than through the lower portion thereof, as clearly shown in Fig. 7, and it is grooved on its rearward side, as shown at $c$, Fig. 7, to fit partly around one of the tubes 3. This provides two rearward extensions at opposite sides of the groove and the lower portions of these extensions are cut away, as clearly shown in Fig. 7, to provide hook-shaped parts $d$. These parts $d$ of the bricks 4 are hooked over the lips $b$ of the bricks A so that the face bricks 4 are suspended in their operative positions in the wall. They preferably are arranged in vertical rows, as shown in Fig. 1, each brick fitting partly around one of the tubes 3, as indicated in Figs. 3 and 4, thus protecting the tubes from the intense heat of the combustion chamber. The drawings illustrate a preferred arrangement, and it will be seen from an inspection of Figs. 2 and 7 that the lower edges of the hook-shaped portions d, or, in other words, the lateral slots provided in the rearward extensions of the blocks 4, have surfaces which are inclined rearwardly where they rest upon the marginal lips b of the bricks A so that in addition to suspending the facing blocks in their operative positions, these blocks tend to gravitate on the supporting blocks until their grooved surfaces c rest firmly against the fire sides of the tubes 3 as indicated, for example, in Fig. 3. Suitable clearances are provided, as shown in Fig. 2, to permit such a gravitational movement. This contact of the facing blocks with the tubes is desirable in order to promote the transfer of heat from the blocks to the tubes where the heat will be swept away by the circulation of the water, steam, or other fluid in them.

It will be clear from an inspection of Fig. 2 that any one of the bricks 4 can readily be lifted off its supporting member b and removed from the wall at the fire side thereof. In order to lock the bricks normally against such removal key bricks 5 or 5' are provided. Both the upper and lower surfaces of each of the bricks 4 are inclined downwardly and rearwardly from the face of the wall, and they are so positioned that a correspondingly inclined space is provided between each pair of vertically adjacent bricks 4. The key bricks fit somewhat loosely into these spaces, each of these bricks having a relatively thick front portion, as clearly shown in Figs. 2, 8 and 9, and a thinner rearward portion which is grooved, as indicated at e, to receive one of the tubes 3. Both the upper and lower faces of these key bricks are inclined to fit between the correspondingly inclined faces of the bricks 4 both above and below it, so that the key bricks are held in their proper positions in the wall by gravity. Consequently, any vibration of the wall tends to seat them all the more firmly.

Each of these key bricks locks the face brick 4 on which it rests against removal from the wall since it prevents the upward lifting or outward swinging of the latter brick which is necessary in order to disengage it from the lip b of its supporting brick A. Whenever repairs are necessary, however, any desired number of key bricks can readily be slipped out of the wall at the fire side thereof, after which their cooperating face bricks 4 can be lifted out of position at the same side of the wall. In renewing any portion of the wall the facing bricks 4 are first placed in position and the key bricks later are slipped into the spaces between the vertically adjacent face bricks.

Since each face brick 4 has its own locking brick or key brick, the facing for the wall may be regarded as made up of a series of units each comprising a facing brick and a locking brick for it. It should be observed that adjacent units are independent of each other, any unit being removable from the wall without disturbing its neighbor. Also, that a slight clearance is provided both horizontally and vertically between adjacent units so that the bricks composing each unit can expand and contract independently of adjacent units. This construction, therefore, prevents the expansion of the units from becoming cumulative as it would be if it were communicated from one unit to another. Such expansion has proved to be a very serious factor in some of the prior constructions.

In a wall built as shown in Fig. 2 where the permanent wall section 2 is of masonry construction, there is relatively little opportunity for serious air leakage through the wall. Provision has been made, however, for reducing this air leakage in the upper part of the wall by making the key brick and face brick of each unit overlap each other. It will be observed that the key bricks 5' which cooperate with the two upper horizontal rows of face bricks 4 are shaped as best shown in Fig. 8, and that the lower margin of each of the face bricks 4 is notched to receive the upper part of its cooperating key brick. A packing 6 of any suitable heat resisting cement such as fire clay and asbestos mixed together, may be pressed into the space in the wall behind the key bricks 5' prior to inserting these bricks in order to assist in preventing air leakage through the upper part of the wall. Such a packing, also, may be used at 7, Fig. 5, between the key bricks 5' for the same purpose, these key bricks being grooved as indicated at f, Fig. 8, to receive the packing. Usually, however, this expedient is not necessary.

In some installations it is desirable to clamp the tubes 3 in properly spaced relationship to each other. An arrangement suitable for this purpose is shown in Fig. 6. In this construction a horizontal angle bar 8 is located immediately behind the tubes and is clamped to them by U-bolts 9, a packing 10 of cement if some kind, such as fire clay and asbestos, being used to close the space between the angle bar and the bricks immediately behind it.

In the wall shown in Figs. 1 to 5, inclusive, the joints between adjacent facing bricks are located between adjacent upright tubes 3. It will be understood, however, that by changing the shape of the bricks somewhat the joints could be brought in line with the tubes. Such a construction is shown in Fig. 10 in which the facing bricks 12 are supported on the bricks A of the permanent wall section in the same manner as are the bricks 4. One of these bricks 12 is shown in more detail in Fig. 11, and it will be observed that it is provided at its rearward side with a hook shaped extension g to rest on one of the lips b of the brick A. These bricks g also fit partly around the two tubes 3 between and in front of which it is located, and a key brick cooperates with it to lock it in position as in the construction shown in Figs. 1 and 2.

The wall construction provided by this invention can be built economically and will give long and efficient service. When repairs are required or it is necessary to renew the wall these operations can be performed rapidly without disturbing the tubes or the permanent section of the wall. An efficient transfer of heat from the facing to the tubes is provided by the ample contact between the tubes and the bricks which make up the facing. At the same time the bricks afford abundant protection for the tubes. Due to the peculiar construction of the facing bricks they can be manufactured at a very reasonable expense from silicon carbide or other refractory material, since the weight of the material used in the brick is relatively small in proportion to the surface which it presents to the fire.

While I have herein shown and described preferred embodiments of my invention, it will be understood that the invention may be embodied in a considerable variety of forms without departing from the spirit or scope thereof.

Having thus described my invention, what I desire to claim as new is:

1. In a furnace wall, the combination of a permanent wall section, tubes at the forward side of said section, and a facing of highly refractory bricks supported on said permanent wall section for removal therefrom at the fire side of the wall and covering substantially the entire widths of said tubes at the fire sides thereof, and serving to protect said section and said tubes.

2. In a furnace wall, the combination of a permanent wall section, tubes at the forward side of said section, a facing for said section comprising refractory bricks supported on said permanent wall section for removal therefrom at the fire side of the wall and covering substantially the entire widths of said tubes at the fire sides thereof, and key bricks for locking said facing bricks in the wall.

3. In a furnace wall, the combination of a permanent wall section, tubes at the forward side of said section, a facing for said section comprising refractory bricks supported on said permanent wall section for removal therefrom at the fire side of the wall and covering substantially the entire widths of said tubes at the fire sides thereof, and key bricks interposed between certain of said facing bricks and held in the wall by gravity, said key bricks serving to lock the face bricks against removal from the wall.

4. In a furnace wall, the combination of a permanent wall section, tubes at the forward side of said section, and a removable brick facing for protecting the fire sides of said tubes and said permanent wall section, said facing comprising refractory bricks supported by said section covering substantially the entire widths of said tubes at the fire sides thereof and located in edge to edge relationship but free to expand and contract relatively to each other.

5. In a furnace wall, the combination of a permanent wall section, tubes at the forward side of said section, a removable facing of highly refractory bricks covering substantially the entire widths of said tubes at the fire sides thereof and protecting said permanent wall section, said facing comprising a series of independent units each consisting of a main face brick supported on said rear wall section and a key brick locking said face brick against removal from the wall.

6. In a furnace wall, the combination of a permanent wall section, tubes at the forward side of said section, a removable brick facing covering substantially the entire widths of said tubes at the fire sides thereof and protecting said permanent wall section, said facing comprising refractory bricks located in edge to edge relationship but free to expand and contract relatively to each other, said permanent wall section having parts at the front thereof for supporting said face bricks for removal from the wall at the fire side thereof, and key bricks associated with said face bricks and serving to lock the latter bricks in the wall.

7. In a furnace wall, the combination of a permanent wall section, tubes at the forward side of said section, a facing for said section comprising refractory bricks removably supported on said permanent wall section and located in protective relationship to said tubes, and a facing comprising refractory bricks removably supported on said permanent wall section and located in edge to edge relationship to each other but free to expand and contract relatively to each other, said bricks serving to protect said tubes and being shaped and positioned to provide rearwardly inclined spaces between certain of the vertically adjacent bricks, and key bricks removably held in said spaces by gravity and operative when in the wall to lock said face bricks against removal.

8. In a furnace wall, the combination of a permanent wall section, tubes at the forward side of said section, a removable facing of highly refractory bricks for protecting said tubes and said permanent wall section, said permanent wall section including supports on which said facing bricks are suspended in edge to edge relationship over the fire sides of the tubes.

9. In a furnace wall, the combination of a permanent wall section, tubes at the forward side of said section, a removable facing of highly refractory bricks for protecting said tubes and said permanent wall section, said permanent wall section including bricks on which said facing bricks are removably suspended, and key bricks for locking said suspended bricks against removal.

10. In a furnace wall, the combination of an outer wall section, tubes at the forward side of said section, a removable brick facing for protecting said tubes and said permanent wall section, said facing comprising refractory bricks suspended on said outer wall section for removal from said wall at the fire side thereof and located in edge to edge relationship to each other over the fire sides of the tubes, and key bricks removably supported in said wall and operative when in their normal positions in the wall to lock said suspended bricks against removal.

11. In a furnace wall, the combination of a permanent wall section, tubes at the forward side of said section, a removable facing of highly refractory bricks for protecting said tubes and said permanent wall section, said section including supports on which said facing bricks are removably suspended, and said suspended bricks being shaped and positioned to provide rearwardly inclined spaces between vertically adjacent bricks, and key bricks located in said spaces and provided with rearwardly inclined surfaces to fit in said spaces whereby they are held in their operative positions in the wall by gravity.

12. In a furnace wall, the combination of a series of substantially parallel upwardly extending tubes, refractory bricks located in contact with substantial areas of said tubes and in protective relationship to them at the fire sides of the tubes, and permanent supporting means on which said bricks are suspended in their operative positions.

13. In a furnace wall, the combination of a series of substantially parallel upwardly extending tubes, refractory bricks located in contact with substantial areas of said tubes and in protective relationship to them at the fire sides of the tubes, fixed supporting means on which said bricks are suspended in the wall in positions permitting them to be removed from the wall at the fire side thereof, and additional removable bricks for locking said suspended bricks against removal.

14. In a furnace wall, the combination of a series of substantially parallel upwardly extending tubes, refractory bricks located in contact with substantial areas of said tubes and in protective relationship to them at the fire sides of the tubes, fixed means supporting said bricks in suspended positions but permitting the bricks to be lifted therefrom and removed from the wall at the fire side thereof, and key bricks normally held in the wall by gravity and serving to lock said suspended bricks against said lifting movement, said key bricks being removable from the wall at the fire side thereof.

15. In a furnace wall, the combination of a permanent wall section, upwardly extending tubes located at the front of said section, and a facing for said section comprising refractory bricks having hook shaped portions projecting between the tubes and removably supported on said permanent wall section, said bricks fitting partly around the tubes, and additional refractory bricks cooperating with the first mentioned bricks to lock the latter bricks against removal from the wall.

16. In a furnace wall, the combination of a permanent wall section, upwardly extending tubes located at the front of said section, said section including supports located between said tubes, a facing for said section comprising refractory bricks having rearwardly extending hook shaped portions resting on said supports, said bricks having rearwardly inclined upper and lower surfaces, and key bricks having correspondingly inclined upper and lower surfaces, said key bricks being located between said vertically adjacent face bricks.

17. In a furnace wall, the combination of a permanent wall section, upwardly extending tubes located at the front of said section, said section including bricks having portions projecting forward between adjacent tubes and provided at their forward ends with upwardly extending lips, and a facing for said section comprising refractory bricks provided with hook shaped portions projecting between said tubes and resting upon the lip shaped members of the bricks of said permanent wall section, said facing bricks fitting partly around the tubes but being removable from the wall, and key bricks forming part of the face portion of the wall and removably positioned between the facing bricks and serving while in the wall to lock the latter bricks against removal from the wall.

18. In a furnace wall, the combination of a permanent wall section, tubes at the forward side of said section, a removable facing of highly refractory bricks for protecting said tubes and said permanent wall section, said permanent wall section including supports on which said facing bricks are suspended in edge to edge relationship, said facing completely covering said tubes.

19. In a furnace wall, the combination of upwardly extending spaced tubes, a facing of refractory blocks shaped to fit against and partly around the tubes, said blocks being located in edge to edge relationship and substantially covering the fire sides of said tubes, and permanent supporting means located in the spaces between the tubes for suspending said blocks in said relationship to said tubes.

20. In a furnace wall, the combination of upwardly extending spaced tubes, a renewable facing at the fire sides of said tubes composed of fire resisting blocks, and means located in the spaces between said tubes for supporting said blocks; said blocks and said means being shaped and proportioned for interlocking engagement with each other to support said blocks for removal from the wall at the fire side thereof without disturbing said supporting means, and means releasable at the fire side of the wall for locking said blocks against removal from the wall.

21. In a furnace wall, the combination of upwardly extending spaced tubes, a facing of refractory blocks shaped to fit against and partly around the tubes, said blocks being located in edge to edge relationship and substantially covering the fire sides of said tubes, and permanent supporting means located in the spaces between the tubes for suspending said blocks independently of each other for individual removal from the wall at the fire side thereof to permit renewal of any of said blocks.

22. In a furnace wall, the combination of a permanent wall section, upwardly extending tubes located at the front of said section, a facing for said wall comprising refractory blocks located in edge to edge relationship and substantially covering the entire widths of the fire sides of the tubes, said blocks having rearwardly extending hook shaped portions, and supporting elements located between the tubes for engaging said hook shaped portions and supporting the blocks of said facing for removal from the wall at the fire side thereof without disturbing said permanent wall section.

23. In a furnace wall, the combination of upwardly extending spaced tubes and a facing protecting said tubes at the fire sides of the tubes, said facing comprising fire resisting blocks located in edge to edge relationship, and permanent supporting means for suspending said blocks individually for expansion and contraction relatively to each other and to the tubes and for removal from the wall at the fire side thereof when renewal of the facing becomes necessary.

24. A fire resisting block for furnace wall construction comprising a body shaped to fit against and partly around a tube, the upper portion of said block being thickened to provide a rearwardly extending hook portion to fit over a support.

25. A fire resisting block for furnace wall construction comprising a body grooved to fit against and partly around a tube, the upper portion of said block being thickened to provide a rearwardly extending hook portion to fit over a support located at one side of the tube.

26. A fire resisting block for furnace wall construction comprising a body shaped to fit against and partly around a tube, the upper portion of said block being thickened to provide a rearward extension slotted laterally to fit over a support located at one side of the tube.

27. In a furnace wall, the combination of upwardly extending spaced tubes, a facing of refractory blocks shaped to fit against and partly around said tubes in a heat transfer relationship to them, said blocks being located in edge to edge relationship and protecting the fire sides of the tubes from the heat in the combustion chamber, and means located in the spaces between the tubes and engageable with said blocks for supporting said blocks in said relationship, said means and said blocks being shaped and proportioned for interlocking engagement with each other and to cause the blocks to be held by gravity in contact with the tubes.

28. In a furnace wall, the combination of upwardly extending spaced tubes, a renewable wall facing at the fire sides of said tubes composed of fire resisting blocks, and means located in the spaces between said tubes and engageable with said blocks for operatively supporting said blocks, said blocks and said means being shaped and proportioned for cooperative engagement with each other to cause the blocks to gravitate toward the tubes and into contact with them and to support said blocks for removal from the wall at the fire side thereof without disturbing said supporting means.

29. In a furnace wall, the combination of upwardly extending spaced tubes, said wall having a rear section located chiefly behind said tubes and a facing section located chiefly in front of said tubes and including a multiplicity of refractory blocks for protecting said tubes at the fire side of the wall, said sections having engaging parts which are constructed and arranged to lock the facing blocks to said rear section and to cause said blocks to gravitate toward and into contact with the tubes to hold them in a heat transferring relationship to the tubes.

30. In a furnace wall, the combination of upwardly extending spaced tubes, said wall having a rear section located chiefly behind said tubes and a facing section located chiefly in front of said tubes and including a multiplicity of refractory blocks for protecting said tubes at the fire side of the wall, said sections cooperating to substantially surround the tubes, and said rear section having means engageable with said facing blocks for supporting said facing blocks in positions to cause them to gravitate toward and into contact with the tubes but leaving them free for removal from the wall at the fire side thereof without disturbing said rear wall section.

OSCAR NYGAARD.